US012737253B2

(12) United States Patent
Möhler et al.

(10) Patent No.: US 12,737,253 B2
(45) Date of Patent: Sep. 15, 2026

(54) FAILURE REMEDY IN COMPUTING SYSTEMS USING ACTION PATTERN DATABASE

(71) Applicant: International Business Machines Corporation, Armonk, NY (US)

(72) Inventors: Gregor Möhler, Boeblingen (DE); Thomas Lumpp, Pliezhausen (DE); Fabian Sehm, Nienhagen (DE); Martin Henke, Reutlingen (DE); Daniel Pittner, Esslingen am Neckar (DE); Nico Friedrich, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 18/747,524

(22) Filed: Jun. 19, 2024

(65) Prior Publication Data

US 2025/0355758 A1 Nov. 20, 2025

(30) Foreign Application Priority Data

May 16, 2024 (GB) .................................... 2406925

(51) Int. Cl.
*G06F 11/07* (2006.01)

(52) U.S. Cl.
CPC ...... *G06F 11/0793* (2013.01); *G06F 11/0748* (2013.01)

(58) Field of Classification Search
CPC ............ G06F 11/0793; G06F 11/0709; G06F 11/0748; G06F 11/0766; G06F 11/0784; G06F 11/079
See application file for complete search history.

(56) References Cited

U.S. PATENT DOCUMENTS 9,189,317 B1 11/2015 Marimuthu
9,354,962 B1 * 5/2016 Dong .................. G06F 11/079
10,601,640 B1 3/2020 Das
(Continued)

FOREIGN PATENT DOCUMENTS

KR 102473637 B1 12/2022

OTHER PUBLICATIONS

Mell et al., "The NIST Definition of Cloud Computing", National Institute of Standards and Technology, Special Publication 800-145, Sep. 2011, 7 pages.
(Continued)

*Primary Examiner* — Gabriel Chu
(74) *Attorney, Agent, or Firm* — Scott Dobson

(57) ABSTRACT

A method for operating a first computer system is provided. The method includes: building a database comprising entries, each entry indicating a failure in one or more second computer systems and an action pattern to remedy the failure, the action pattern indicating log files to be accessed to remedy the failure. In response to detecting a failure in the first computer system, one or more entries of the database that match the detected failure may be identified. The one or more action patterns associated with the identified one or more entries may be used for extracting debugging data representing the detected failure. At least part of the debugging data may be sent to an external system. In response to the sending, instructions to remedy the detected failure may be received from the external system.

18 Claims, 4 Drawing Sheets

(56) References Cited

U.S. PATENT DOCUMENTS

| | | | | |
|---|---|---|---|---|
| 10,956,299 | B2 | 3/2021 | Krishnan | |
| 11,586,972 | B2 | 2/2023 | Wang | |
| 12,292,788 | B2 * | 5/2025 | Roychowdhury | G06F 11/0793 |
| 2004/0024726 | A1 * | 2/2004 | Salem | G06F 11/079 714/E11.026 |
| 2010/0042867 | A1 | 2/2010 | Guven et al. | |
| 2014/0288920 | A1 * | 9/2014 | Proux | G10L 15/00 704/9 |
| 2019/0057006 | A1 * | 2/2019 | Boyapalle | G06F 11/3452 |
| 2019/0377900 | A1 * | 12/2019 | Balzer | G06F 40/205 |
| 2021/0073461 | A1 * | 3/2021 | Heckel | G06N 3/045 |
| 2023/0039566 | A1 * | 2/2023 | Ghag | G06F 11/0736 |
| 2023/0273849 | A1 * | 8/2023 | Mahindru | G06F 11/0778 714/37 |
| 2023/0281070 | A1 * | 9/2023 | Harutyunyan | G06F 18/214 714/37 |
| 2023/0385142 | A1 * | 11/2023 | Bhat | G06F 11/0784 |
| 2024/0241974 | A1 * | 7/2024 | Mola | G06F 11/34 |
| 2025/0021426 | A1 * | 1/2025 | Kwon | G06F 11/0787 |
| 2025/0112667 | A1 * | 4/2025 | Ran | H04L 1/244 |
| 2025/0209261 | A1 * | 6/2025 | Carbune | G06F 16/33295 |
| 2025/0238310 | A1 * | 7/2025 | Kanagovi | G06F 11/0793 |
| 2025/0265420 | A1 * | 8/2025 | Kesarwani | G06F 16/3329 |
| 2025/0281088 | A1 * | 9/2025 | Bouchon | A61B 5/4836 |
| 2025/0284985 | A1 * | 9/2025 | Shirrell | G06N 3/0475 |

OTHER PUBLICATIONS

Mohler, Gregor, "Method and System for Failure Remedy in Computing Systems Using Action Pattern Database", United Kingdom Application No. 2406925.4, Filed May 16, 2024, 34 Pgs.

Intellectual Property Office, "Patents Act 1977: Search Report under Section 17(5)", Oct. 11, 2024, 3 Pages, GB Application No. 2406925.4.

* cited by examiner

FAILURE REMEDY IN COMPUTING SYSTEMS USING ACTION PATTERN DATABASE

BACKGROUND

The present disclosure relates to the field of digital computer systems, and more specifically, to a method for operating a computer system.

In the realm of computing systems, failures may be an inevitable occurrence. These failures can range from minor glitches to catastrophic system crashes and can be caused by a multitude of factors such as hardware malfunctions, software bugs, or user errors. When a failure occurs, it may typically be addressed by a series of actions taken by system administrators or other individuals responsible for the operation and maintenance of the affected system.

SUMMARY

According to embodiments of the present disclosure, a method for operating a first computer system is provided. The method comprises: building a database comprising entries, each entry indicating a failure in one or more second computer systems and an action pattern to remedy the failure, the action pattern indicating log files to be accessed to remedy the failure, in response to detecting a failure in the first computer system, identifying one or more entries of the database that match the detected failure, using the one or more action patterns associated with the identified one or more entries for extracting debugging data representing the detected failure, sending at least part of the debugging data to an external system, in response to the sending, receiving from the external system instructions to remedy the detected failure.

Further embodiments provide a computer program product comprising a computer-readable storage medium having computer-readable program code embodied therewith, the computer-readable program code configured to implement the method of the above embodiment.

Further embodiments provide a system for operating a first computer system. The system includes one or more processors in communication with one or more memories. The system is configured to perform the method of the above embodiment.

BRIEF DESCRIPTION OF THE DRAWINGS

In the following embodiments of the invention are explained in greater detail, by way of example only, making reference to the drawings in which.

DETAILED DESCRIPTION

Figure 1:
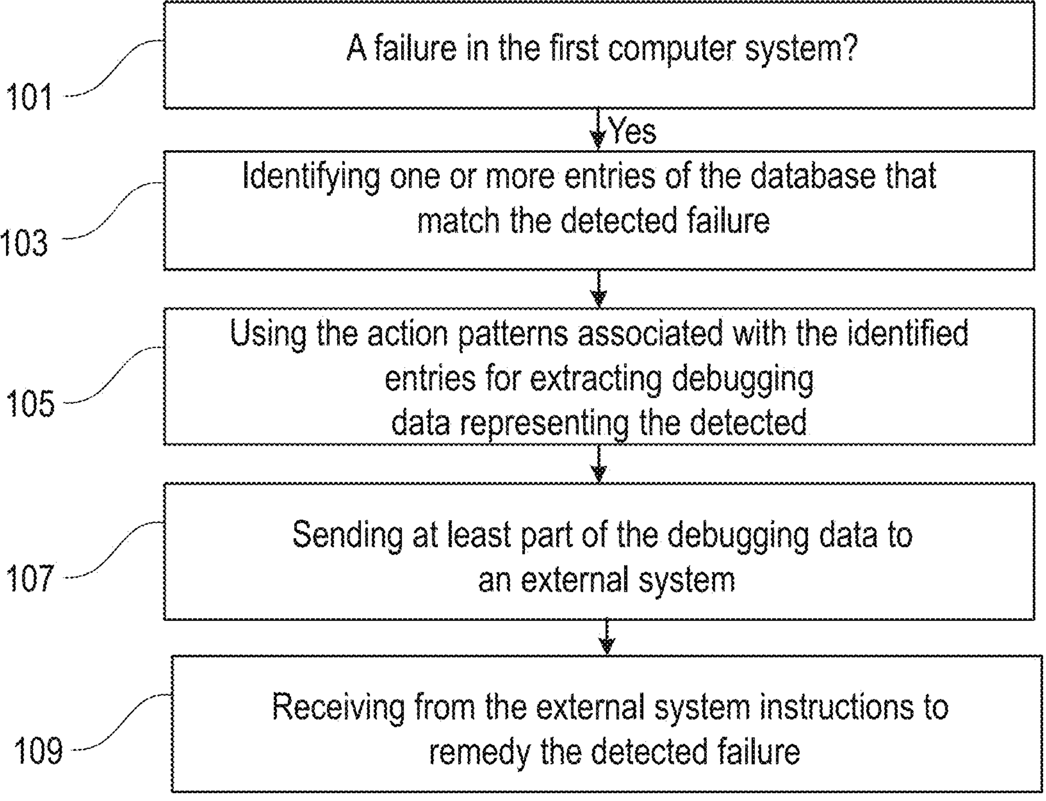
FIG. 1 depicts a flowchart of a detection method for operating a first computer system in accordance with an example of the present subject matter.

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may be advantageous for the following reasons. Over time, a wealth of knowledge and experience may be accumulated regarding the types of failures that can occur and the actions that can be taken to resolve them. This knowledge may be shared among the community of system administrators and other individuals involved in the operation and maintenance of computing systems. However, the ad-hoc process of sharing may be time-consuming and inefficient, particularly as the volume of knowledge and the complexity of the systems involved continue to increase. The present subject matter may streamline the process of addressing system failures, reduce downtime, and improve the overall reliability and performance of computing systems by efficiently utilizing knowledge regarding system failures and the actions taken to resolve them.

The present method may involve the construction of a database, which is populated with entries. The database may also be referred to as action pattern database. Each entry may signify a failure in one or more second computer systems and an action pattern representing actions that have been employed to rectify (or solve or remedy) the failure. Each action pattern may indicate log files which may have been accessed or used to solve the failure. The log files are used to solve the failure e.g., by an administrator. Alternatively, the log files indicated each action pattern may be defined based on some heuristics. The heuristics may help identify potential solutions without requiring actual testing and remedying the failure. The log file may be a record of events that occur within a computing system, application, or service, containing timestamps and event-specific information. The log file may serve as a historical record of activities, including transactions, errors, and other occurrences. The log file may, for example, be provided as a text file or XML file.

The failure in the first or second computer system may arise from various sources and affect the system's functionality, performance, or security. The failure may include at least one of: hardware failure, software failure or network failure. The hardware failure may, for example, include at least one of: storage device failure, processor (CPU) malfunction, memory (RAM) errors, power supply failure, motherboard failures, or cooling system failure. The hardware failure may, for example, include at least one of: operating system crashes, application errors, security vulnerabilities or update and patch failure. The network failure may, for example, include at least one of network hardware failure, configuration errors, connectivity issue, or bandwidth limitation.

Each log file in an action pattern may be the log file that has been accessed by one or more actions that are represented by the action pattern. An example action may include a hardware repair or replacement. Indeed, if a hardware component is found to be faulty, it may need to be repaired or replaced. This may involve using one or more log files of a historical functioning of the hardware component. An example action may include software updates and patches.

Applying software updates and patches may help fix bugs, improve performance, and address security vulnerabilities. This action may use one or more log files e.g., for identifying issues, where the log file may provide insights into issues or bugs within the current software version. An example action may include configuration adjustments. Indeed, some issues may be resolved by adjusting system configurations. This may, for example, involve modifying settings related to network connectivity, power management, display resolution, or software preferences. This action may use one or more log files descriptive of the function of the components the settings of which are changed by the action.

Upon detecting a failure in the first computer system, the method includes identifying one or more entries in the database that correspond to the detected failure. The action patterns associated with these identified entries may then be utilized to extract or generate the debugging data. For example, if a second computer system experiences a network connectivity issue that has been previously resolved by restarting a specific service and checking a particular log file for errors, the database entry for this scenario may include the log file. When a similar network connectivity issue arises in the first computer system, the method may identify this database entry and collect data from similar log file.

At least part of the debugging data may be sent to an external system. The external system may be managed by an expert that can fix failures at the first computer system. In response to the sending of the at least part of the debugging data, instructions to solve the detected failure may be received from the external system. The instructions may be executed to remedy the detected failure.

The external system may refer to any system that interacts with or provides services to the first computer system but is not part of its internal components or architecture. The external system may, for example, be a peripheral system or a networked computing system. The external system may be connected to the first computer system through a connection. Depending on the type of external system, the connection may include universal serial bus (USB) connection, Ethernet connection, or one or more network connections. A user of the external system may analyse the at least part of the debugging and provide e.g., via an interface (such as a GUI), to the external system an input including the instructions to solve the detected failure. In response to receiving the input, the external system may send the instructions to the computer system that implements the detection method.

According to one example, in each entry of the database, the action pattern of the entry may further indicate a duration of access to each log file of the log files of the entry and an order of access to the log files. Alternatively, or additionally, the action pattern may indicate a performance metric of one or more system components which are related to the failure. The performance metric may, for example, CPU usage, memory usage etc. This may enhance the content of the extracted debugging data and thus may increase the probability of finding and/or speed up the process of finding a remedy to the detected failure.

According to one example, the first computer system is a secure computer system (or secured system), and the second computer systems are unsecure computer systems. The secure computer system may implement hardware and software that is designed to protect against unauthorized access, damage, or theft of information. A computer system which is not the secure computer system may be referred to as unsecure computer system. In one example, the secure computer system may be a secure cloud system which is said to be behind a security boundary.

In one example, the at least part of the debugging data may be the debugging data. Alternatively and according to one example, the method further comprises preprocessing the debugging data, wherein the at least part of debugging data that has been sent is the pre-processed data, wherein the preprocessing comprises at least one of: removing sensitive information from the debugging data, resulting in modified debugging data, or processing the debugging data so that the debugging data has an informativeness that is smaller than a threshold.

For example, the removal of the sensitive information may be performed by masking the sensitive information. The masking may be performed using a predetermined algorithm before the debugging data is further analysed. Removing any sensitive information contained within the data may ensure that confidential data is not exposed during the debugging process. The present example may also provide a collaborative approach. This collaborative approach may ensure a swift and accurate resolution of the failure, minimizing downtime and optimizing system performance. For example, in a scenario where the first computer system experiences a software malfunction, the method may involve extracting relevant debugging data such as error logs and system performance metrics. The sensitive information, such as user credentials or proprietary code snippets, may then be redacted from the debugging data before it is transmitted to the external system. The external system, equipped with specialized diagnostic tools, may analyze the debugging data and provide specific instructions on how to rectify the software malfunction.

The informativeness may be a measure of how much valuable knowledge or insight is conveyed by the debugging data. The informativeness of the debugging data may be measured using an informativeness metric. The informativeness metric may, for example, comprise at least one of: the size of the debugging data, the variety of the debugging data or the veracity of the debugging data. The informativeness metric may, for example, comprise the size of the debugging data. Indeed, larger datasets can potentially offer more insights. The informativeness metric may comprise a variety metric which represents the number of different types of data (numerical, categorical, text, etc.) and the range of subjects or variables covered in the debugging data. For example, higher variety can increase the potential for uncovering insights. The informativeness metric may comprise a veracity metric which represents the accuracy, reliability, and truthfulness of the debugging data. For example, high veracity indicates that the data is likely to be informative and useful for making accurate predictions. The threshold may be set based on the metric(s) being used.

According to one example, the sensitive information comprises at least one of: personal identification information, secure system inventory information, custom patterns provided by customers or encryption information.

This may, for example, enable only authorized personnel may have access to personal identification information, while secure system inventory information may be restricted to a subset of users.

The sensitive information may, for example, include user credentials, IP addresses, or proprietary code snippets. The secure system inventory information may be a record that includes detailed information about the hardware and software components within a computer system. This information may be essential for effective asset management, security, compliance, and operational efficiency. The secure system inventory information may, for example, include at least one of: hardware inventory including details hardware model, serial number, location, and responsible user for each device, software inventory, configuration details for both hardware and software, include configuration settings, installed patches, and version numbers, or network configuration. The custom patterns may, for example, include patterns for software development. For example, customers may provide custom user interface (UI) patterns or design frameworks that they want to be implemented in the application being developed. This may include specific layouts, color schemes, or functionality patterns. The custom patterns may, for example, include patterns for hardware specifications. For example, customers might need specific hardware configurations. This may include custom-built servers with particular processors, memory, storage capacities, or networking capabilities. The encryption information may be information descriptive of one or more encryptions being used at the first computer system. The encryption information may, for example, include the specific algorithm(s) used for encryption and/or the size of the encryption key being used.

According to one example, after removing the sensitive information, the method comprises changing the resulting debugging data for compensating for the removed information in the debugging data. The changing of the resulting debugging data is for the purpose of compensating for the information that has been removed from the debugging data. The changing is performed by prompting a user to do the change and the receiving the changed debugging data. Alternatively, the changing is performed by using a large language model (LLM).

By compensating for the removed text, this example, may assist users in identifying relevant actions and generating effective action patterns to address the detected failure in the first computer system. By leveraging machine learning algorithms, the LLM can further improve the assistance to the users.

In one example, the LLM may be an existing trained LLM. This may enable seamless integration of this example with existing systems. Alternatively, an existing pre-trained LLM may be fine-tuned using debugging data of computer systems from which sensitive information is removed from the debugging data. The LLM may be fine-tuned to replace the existing removed sensitive information by another information which is not sensitive but still represent the same content. This may enhance its ability to interpret and compensate for the removed information accurately.

According to one example, the at least part of the debugging data may be analysed by an operator associated with the external system in order to provide. The instructions to remedy the detected failure.

For example, when a failure is detected in the first computer system, the present method may automatically generate a pop-up window on the external system's screen displaying the debugging data and a request to provide instructions based on the debugging data. The operator may then review the debugging and provide the instructions in the window. Alternatively, the at least part of the debugging data may be provided to the operator through a mobile application of the external system.

According to one example, the identifying of the one or more entries comprises: computing a similarity between the detected failure and failures indicated in the entries and selecting each entry of the entries having a similarity higher than a threshold.

The similarity computation may be based on various factors such as error codes, error messages, system logs, or any other relevant data associated with the failures. For example, if the detected failure is related to a network connectivity issue, the entries that also involve network-related problems may have higher similarity values. Once the similarities are computed, the method proceeds to select entries that meet a certain threshold of similarity with the detected failure. This threshold may be predetermined based on the specific requirements of the system or dynamically adjusted based on the available entries in the database. For instance, if the threshold is set at 80% similarity, only entries with a similarity score higher than 80% may be considered for further processing.

According to one example, the extracting of the debugging data comprises: for each identified entry: selecting one or more log files of the action pattern of the entry based on the duration and the order of access indicated in the action pattern, and for each log file of the selected log files collecting log data of a corresponding log file in the first computer system. By collecting and analyzing the log data, the system may gain insights into the root cause of the failure and verify the effectiveness of the selected actions.

According to one example, each system of the first computer system and the second computer systems is a cloud system. That is, both the first computer system and the second computer systems are cloud-based systems. This cloud environment may offer scalability, flexibility, and accessibility, making it an ideal platform for implementing the method described herein.

According to one example, the steps of detecting of the failure, the identifying of the entries, the extracting of the debugging data, the sending of the at least part of the debugging data and the receiving of the instruction may form a detection method. The detection method is provided as a cloud service of the first computer system which is a cloud system, wherein the detection method is executed in response to receiving a service request through the cloud service.

The cloud service may provide the ability to scale resources up or down based on demand of creating action patterns. This may allow to easily accommodate fluctuating workloads and scale their infrastructure as needed. The cloud service may further easy access to the service of creating action patterns from anywhere, at any time, as long as there is an internet connection.

According to one example, the method further comprises deploying the database at the first computer system, wherein the detection method is performed at the first computer system. This may enable a local processing and solving of the failures. This may enable a secure and fast processing of the failures since they are not sent to external systems.

According to one example, the building of the database is performed such that the database comprises a number of entries higher than a minimum number. This may ensure that the database have enough entries that can be used for any detected failure.

FIG. 1 is a flowchart of a method, named detection method, for operating a first computing system in accordance with an example of the present subject matter. The method may use a database comprising entries. Each entry indicates a failure in one or more second computer systems and an action pattern to remedy the failure. The action pattern indicates log files to be accessed to remedy the failure.

It may be determined in step 101 whether a failure is detected in the first computer system. Step 101 may be repeated until a failure is detected. In response to detecting the failure in the first computer system, one or more entries of the database that match the detected failure may be identified in step 103. The one or more action patterns associated with the identified one or more entries may be used for extracting in step 105 debugging data representing the detected failure. At least part of the debugging data may be sent in step 107 to an external system. In response to the sending, instructions to remedy the detected failure may be received in step 109 from the external system.

Figure 2:
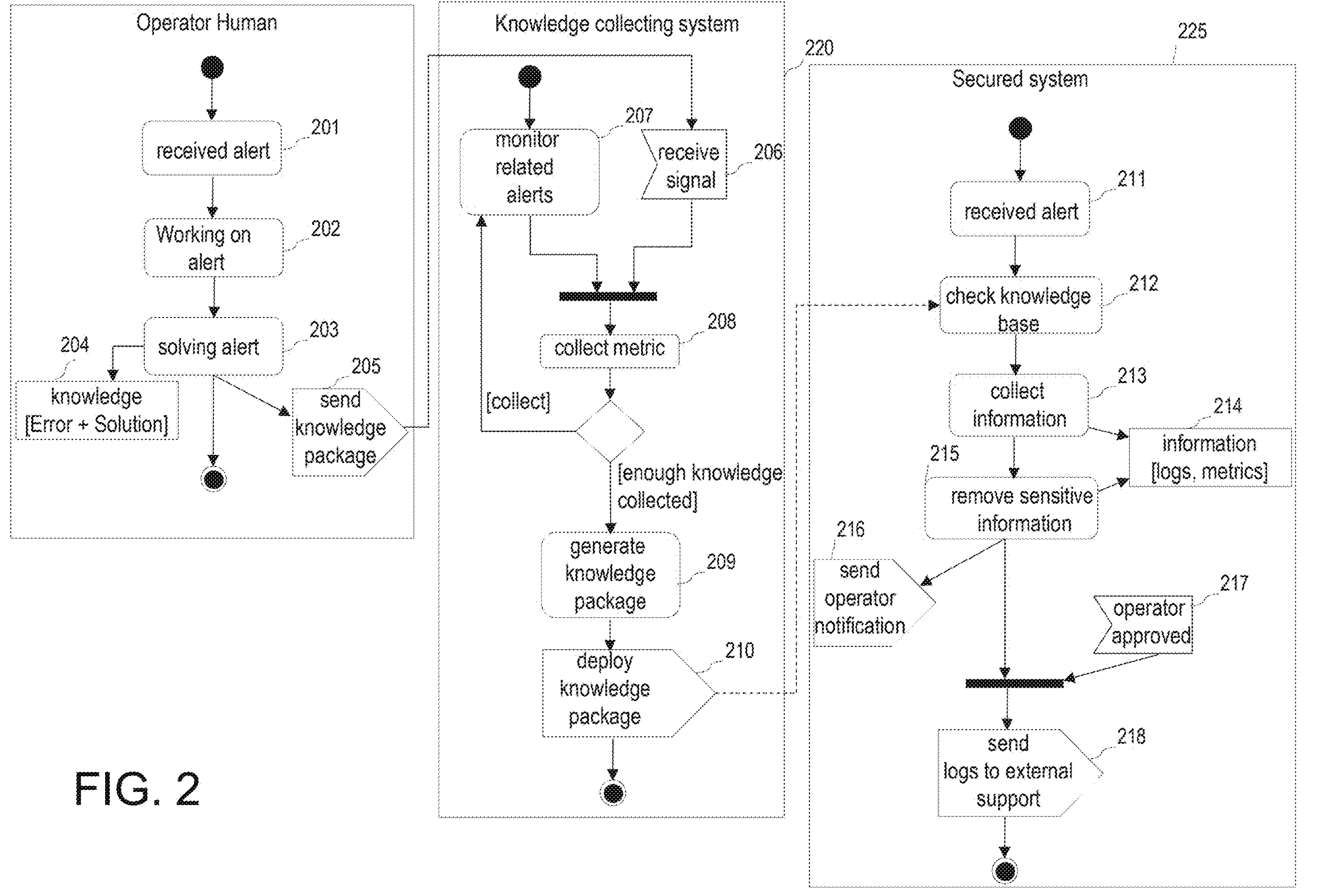
FIG. 2 depicts a diagram of a system illustrating a method for remedying failures in a secured system in accordance with an example of the present subject matter.

FIG. 2 is a diagram of a system illustrating a method for solving failures in a secured system in accordance with an example of the present subject matter. Secured system 225 of FIG. 2 may provide an example of the first computer system as described herein. The knowledge base in FIG. 2 may provide an example of the action pattern database. Steps 201 to 209 may provide an example implementation of the step of building the database in the present method.

An alert concerning an operator's system may be received in step 201. The alert may be processed in step 202 by an operator. The error indicated in the alert may be solved by the operator in step 203. The error and associated solution may be provided in step 204 as an entry that may be stored in a knowledge base or knowledge package. The operator may send in step 205 the knowledge entry to a knowledge collecting system 220.

The knowledge collecting system 220 may receive in step 206 a signal comprising the knowledge entry that has been sent by the operator. The knowledge collecting system 220 may, optionally, further monitor in step 207 alerts e.g., in other computing systems, which are related to the received alert and update the knowledge base with entries related to the monitored alerts. The knowledge collecting system 220 may check whether the collection metric is fulfilled or not in step 208. The collection metric may require that the number of collected entries is higher than a threshold. If the collection metric is not fulfilled the knowledge collecting system 220 may wait for receiving further entries with further alerts and their corresponding solutions. If the collection metric is fulfilled the knowledge collecting system 220 may generate in step 209 a knowledge package which comprises all collected entries. In step 210, the knowledge collecting system 220 may deploy the knowledge package in a secured system 225.

The secured system 225 may receive step 211 an alert which indicates a failure or an error in the secured system 225. The secured system 225 may check the knowledge package in step 212 for the entries that correspond to the received alert. The secured system 225 may collect in step 213 information from the entries of the knowledge package that correspond with the received alert. The collected information may comprise log data and performance metrics 214. The secured system 225 may remove in step 215 sensitive information from the collected information. The secured system 225 may send in step 216 the resulting information to the operator in order to receive an approval (217) of the information. In response to receiving the approval from the operator, the secured system 225 may send in step 218 the collected data to an external support in order to receive a solution of the failure that has been received in the alert.

The present subject matter may comprise the following clauses.

Clause 1. A method for operating a first computing system, the method comprising: building a database comprising entries, each entry indicating a failure in one or more second computer systems and an action pattern to remedy the failure, the action pattern indicating log files to be accessed to remedy the failure; in response to detecting a failure in the first computer system, identifying one or more entries of the database that match the detected failure; using the one or more action patterns associated with the identified one or more entries for extracting debugging data representing the detected failure; sending at least part of the debugging data to an external system; in response to the sending, receiving from the external system instructions to remedy the detected failure.

Clause 2. The method of clause 1, the method further comprising preprocessing the debugging data, wherein the at least part of debugging data that has been sent comprises the pre-processed data, wherein the preprocessing comprises at least one of: removing sensitive information from the debugging data, resulting in modified debugging data; or processing the debugging data so that the debugging data has an informativeness that is smaller than a threshold.

Clause 3. The method of clause 2, the sensitive information comprising at least one of: personal identification information, secure system inventory information, custom patterns provided by customers, or encryption information.

Clause 4. The method of clause 2 or 3, wherein after removing the sensitive information, the pre-processing comprises: changing the modified debugging data for compensating for the removed information in the modified debugging data, the changing comprising using a large language model (LLM) or providing to a user the modified debugging data and receiving the changed modified debugging data.

Clause 5. The method of any of the preceding clauses 1 to 4, the identifying of the one or more entries comprising: computing a similarity between the detected failure and failures indicated in the entries; selecting each entry of the entries having a similarity higher than a threshold.

Clause 6. The method of any of the preceding clauses 1 to 5, the action pattern further indicating a duration of access to each log file of the log files and an order of access to the log files, wherein the extracting of the debugging data comprises: for each identified entry: selecting one or more log files of the action pattern of the entry based on the duration and the order of access indicated in the action pattern; for each log file of the selected log files collecting log data of a corresponding log file in the first computer system.

Clause 7. The method of any of the preceding clauses 1 to 6, wherein the first computer system is a secure computer system, and the second computer systems are unsecure computer systems.

Clause 8. The method of any of the preceding clauses 1 to 7, each system of the first computer system and the second computer systems being a cloud system.

Clause 9. The method of any of the preceding clauses 1 to 8, a detection method comprising the identifying, the extracting, the sending and the receiving, wherein the detection method is provided as a cloud service of the first computer system being a cloud system, wherein the detection method is executed in response to receiving a service request through the cloud service.

Clause 10. The method of any of the preceding clauses 1 to 9, further comprising: deploying the database at the first computer system wherein the method is performed by the first computer system.

Clause 11. The method of any of the preceding clauses 1 to 10, wherein the building of the database is performed such that the database comprises a number of entries higher than a minimum number.

Clause 12. A computer program product comprising a computer-readable storage medium having computer-readable program code embodied therewith, the computer-readable program code configured to implement the method of any of the preceding clauses 1 to 11.

Clause 13. A computer system for operating a first computing system, the computer system being configured for: building a database comprising entries, each entry indicating a failure in one or more second computer systems and an action pattern to remedy the failure, the action pattern indicating log files to be accessed to remedy the failure; in response to detecting a failure in the first computer system, identifying one or more entries of the database that match the detected failure; using the one or more action patterns associated with the identified one or more entries for extracting debugging data representing the detected failure; sending at least part of the debugging data to an external system; in response to the sending, receiving from the external system instructions to remedy the detected failure.

Clause. 14. The computer system of clause 13, comprising the first computer system.

Clause 15. The computer system of any of the preceding clauses 13 to 14, being further configured for preprocessing the debugging data, wherein the at least part of debugging data that has been sent is the pre-processed data, wherein the preprocessing comprises at least one of: removing sensitive information from the debugging data, resulting in modified debugging data; or processing the debugging data so that the debugging data has an informativeness that is smaller than a threshold.

Clause 16. The computer system of clause 15, the sensitive information comprising at least one of: personal identification information, secure system inventory information, or custom patterns provided by customers or encryption information.

Clause 17. The computer system of clause 15 or 16, wherein after removing the sensitive information, the computer system is further configured for: changing the modified debugging data for compensating for the removed information in the modified debugging data, the changing comprising using a large language model (LLM) or providing to a user the modified debugging data and receiving the changed modified debugging data.

Clause 18. The computer system of any of the preceding clauses 13 to 17, wherein the computer system is configured to perform the identifying of the one or more entries comprising: computing a similarity between the detected failure and failures indicated in the entries; selecting each entry of the entries having a similarity higher than a threshold.

Clause 19. The computer system of any of the preceding clauses 13 to 18, the action pattern further indicating a duration of access to each log file of the log files and an order of access to the log files, wherein the computer system is configured to perform the extracting of the debugging data comprising: for each identified entry: selecting one or more log files of the action pattern of the entry based on the duration and the order of access indicated in the action pattern; for each log file of the selected log files collecting log data of a corresponding log file in the first computer system.

Clause 20. The computer system of any of the preceding clauses 13 to 19, each system of the first computer system and the second computer systems being a cloud system.

Computing environment 800 contains an example of an environment for the execution of at least some of the computer code involved in performing the inventive methods, such as code 900 for failure resolution in a given computer system. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

Figure 3:
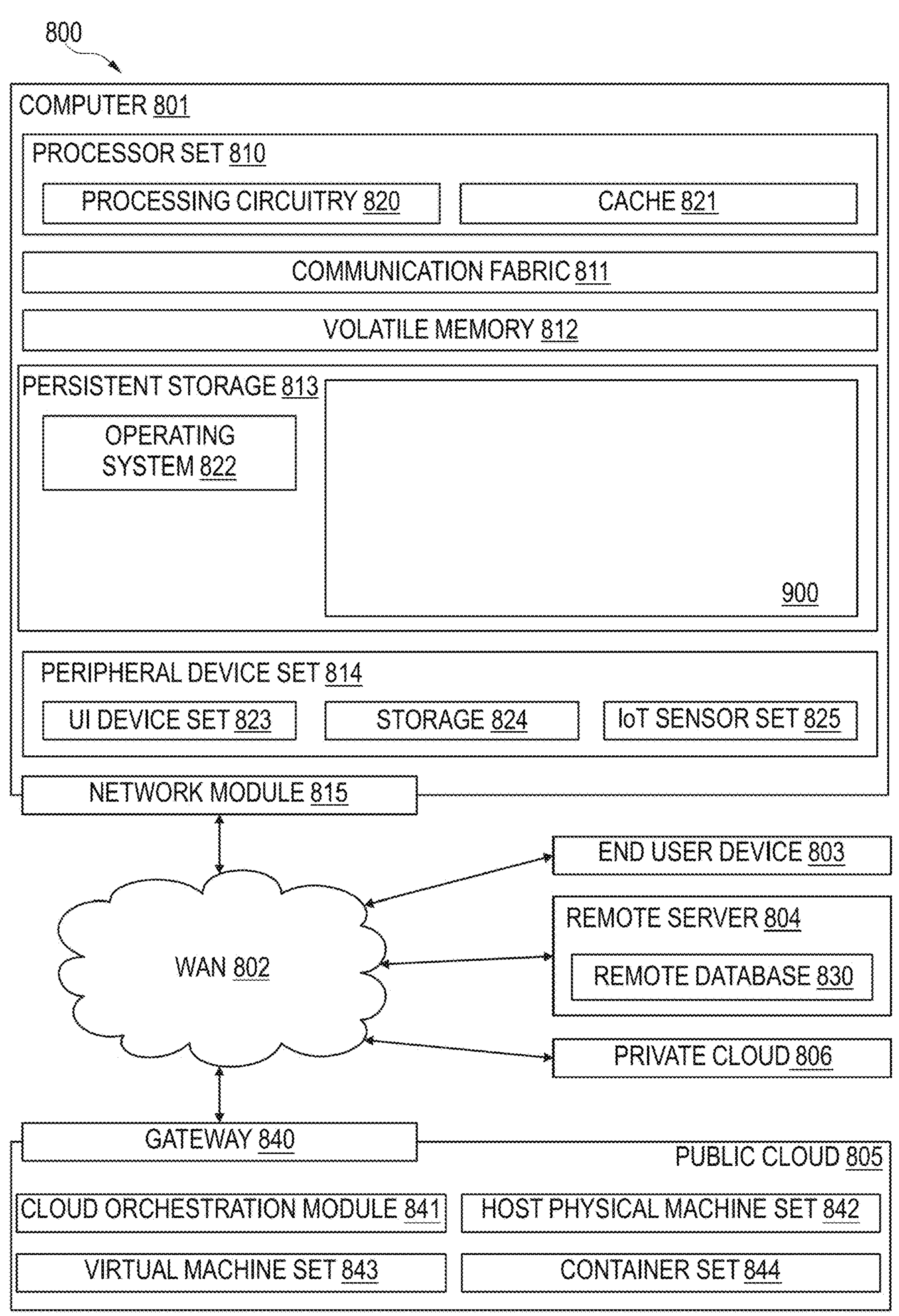
FIG. 3 depicts a computing environment in accordance with an example of the present subject matter.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 3. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801) and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature whichh is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

CLOUD COMPUTING SERVICES AND/OR MICROSERVICES (not separately shown in FIG. 3): private and public clouds are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
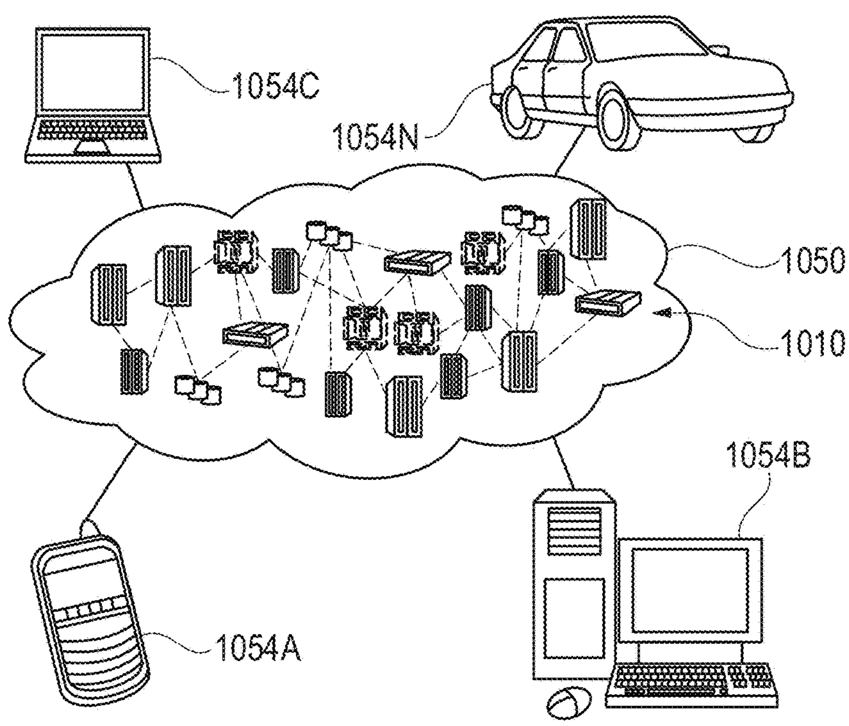
FIG. 4 depicts a cloud computing environment according to an embodiment of the present invention.

Referring now to FIG. 4, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 54N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 4 are intended to be illustrative only and that computing nodes 1010 and cloud computing environment 1050 can communicate with any type of computerized device over any type of network and/or network addressable connection (e.g., using a web browser).

Figure 5:
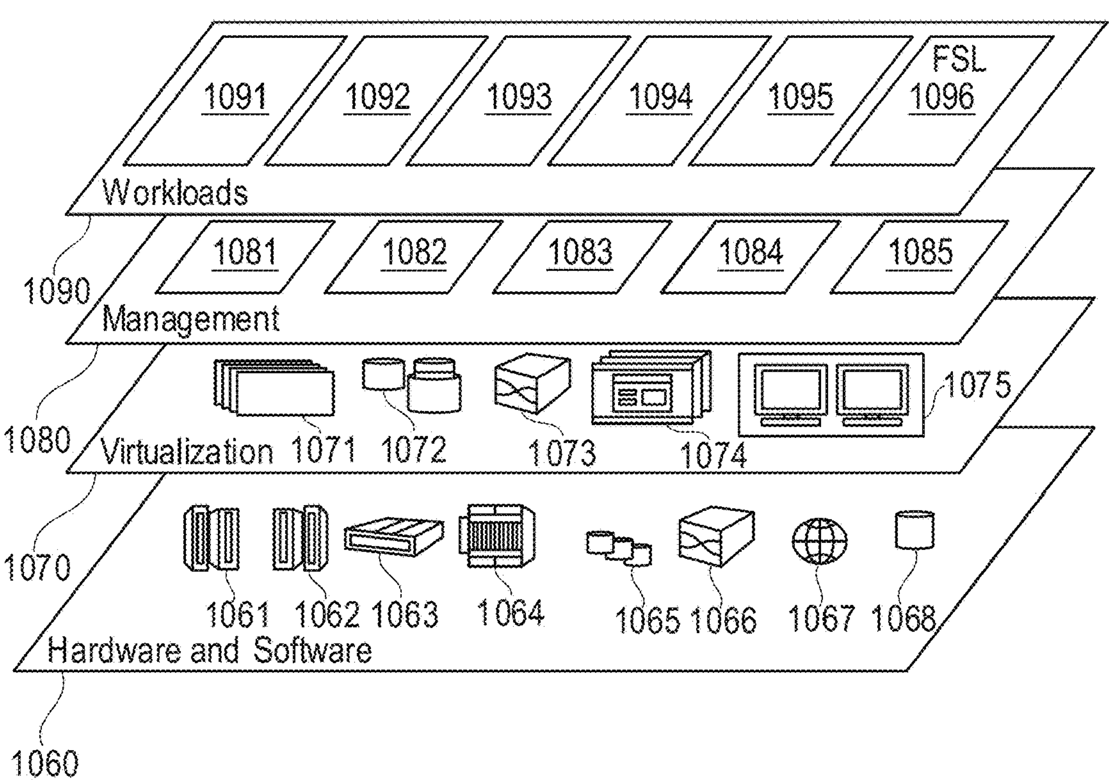
FIG. 5 depicts abstraction model layers according to an embodiment of the present invention.

Referring now to FIG. 5, a set of functional abstraction layers provided by cloud computing environment 1050 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and a failure solving module (FSL) 1096 that obtain instructions, using the detection method, for solving a detected failure in accordance with the present subject matter.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. "A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

What is claimed is:

1. A method for operating a first computer system, the method comprising:

building a database comprising entries, each entry indicating a failure in one or more second computer systems and an action pattern to remedy the failure, the action pattern indicating log files to be accessed to remedy the failure;

in response to detecting a failure in the first computer system, identifying one or more entries of the database that match the detected failure;

using the one or more action patterns associated with the identified one or more entries for extracting debugging data representing the detected failure, wherein the action pattern further indicates a duration of access to each log file of the log files and an order of access to the log files, wherein the extracting of the debugging data comprises:

for each identified entry: selecting one or more log files of the action pattern of the entry based on the duration and the order of access indicated in the action pattern; and for each log file of the selected log files collecting log data of a corresponding log file in the first computer system;

sending at least part of the debugging data to an external system; and in response to the sending, receiving from the external system instructions to remedy the detected failure.

2. The method of claim 1, further comprising preprocessing the debugging data, wherein the at least part of debugging data that has been sent comprises the pre-processed data, wherein the preprocessing comprises at least one selected from the group consisting of:

removing sensitive information from the debugging data, resulting in modified debugging data; and processing the debugging data so that the debugging data has an informativeness that is smaller than a threshold.

3. The method of claim 2, wherein the sensitive information comprises at least one selected from the group consisting of personal identification information, secure system inventory information, custom patterns provided by customers, and encryption information.

4. The method of claim 2, wherein after removing the sensitive information, the pre-processing comprises: changing the modified debugging data for compensating for the removed information in the modified debugging data, the changing comprising using a large language model (LLM) or providing to a user the modified debugging data and receiving the changed modified debugging data.

5. The method of claim 1, wherein the identifying of the one or more entries comprising:

computing a similarity between the detected failure and failures indicated in the entries; and selecting each entry of the entries having a similarity higher than a threshold.

6. The method of claim 1, wherein the first computer system is a secure computer system and the one or more second computer systems are unsecure computer systems.

7. The method of claim 1, wherein each system of the first computer system and the second computer systems are a cloud system.

8. The method of claim 1, wherein the identifying, the extracting, the sending and the receiving are provided as a cloud service of the first computer system being a cloud system, and wherein the identifying, the extracting, the sending and the receiving are executed in response to receiving a service request through the cloud service.

9. The method of claim 1, further comprising deploying the database at the first computer system, wherein the method is performed by the first computer system.

10. The method of claim 1, wherein the building of the database is performed such that the database comprises a number of entries higher than a minimum number.

11. A computer program product comprising a computer-readable storage medium having computer-readable program code embodied therewith, the computer-readable program code executable to perform operations comprising:

building a database comprising entries, each entry indicating a failure in one or more second computer systems and an action pattern to remedy the failure, the action pattern indicating log files to be accessed to remedy the failure;

in response to detecting a failure in a first computer system, identifying one or more entries of the database that match the detected failure;

using the one or more action patterns associated with the identified one or more entries for extracting debugging data representing the detected failure, wherein the action pattern further indicates a duration of access to each log file of the log files and an order of access to the log files, wherein the extracting of the debugging data comprises:

for each identified entry: selecting one or more log files of the action pattern of the entry based on the duration and the order of access indicated in the action pattern; and for each log file of the selected log files collecting log data of a corresponding log file in the first computer system;

sending at least part of the debugging data to an external system; and in response to the sending, receiving from the external system instructions to remedy the detected failure.

12. A system for operating a first computer system, the system comprising one or more processors in communication with one or more memories, the system configured to perform operations comprising:

building a database comprising entries, each entry indicating a failure in one or more second computer systems and an action pattern to remedy the failure, the action pattern indicating log files to be accessed to remedy the failure;

in response to detecting a failure in the first computer system, identifying one or more entries of the database that match the detected failure;

using the one or more action patterns associated with the identified one or more entries for extracting debugging data representing the detected failure, wherein the action pattern further indicates a duration of access to each log file of the log files and an order of access to the log files, wherein the extracting of the debugging data comprises:

for each identified entry: selecting one or more log files of the action pattern of the entry based on the duration and the order of access indicated in the action pattern; and for each log file of the selected log files collecting log data of a corresponding log file in the first computer system;

sending at least part of the debugging data to an external system; and in response to the sending, receiving from the external system instructions to remedy the detected failure.

13. The system of claim 12, wherein the system comprises the first computer system.

14. The system of claim 12, wherein the operations further include preprocessing the debugging data, wherein the at least part of debugging data that has been sent is the pre-processed data, wherein the preprocessing comprises at least one selected from the group consisting of:

removing sensitive information from the debugging data, resulting in modified debugging data; and processing the debugging data so that the debugging data has an informativeness that is smaller than a threshold.

15. The system of claim 14, wherein the sensitive information comprises at least one selected from the group consisting of:

personal identification information, secure system inventory information, and custom patterns provided by customers or encryption information.

16. The system of claim 14, wherein after removing the sensitive information, the operations further comprise changing the modified debugging data for compensating for the removed information in the modified debugging data, the changing comprising using a large language model (LLM) or providing to a user the modified debugging data and receiving the changed modified debugging data.

17. The system of claim 12, wherein the identifying one or more entries comprises:

computing a similarity between the detected failure and failures indicated in the entries; and selecting each entry of the entries having a similarity higher than a threshold.

18. The system of claim 12, each system of the first computer system and the second computer systems being a cloud system.

* * * * *